United States Patent
Zhang et al.

(10) Patent No.: US 11,729,828 B2
(45) Date of Patent: Aug. 15, 2023

(54) ALIGNED LBT GAPS FOR SINGLE OPERATOR FBE NR-SS

(71) Applicant: QUALCOMM Incorporated, San Diego, CA (US)

(72) Inventors: Xiaoxia Zhang, San Diego, CA (US); Jing Sun, San Diego, CA (US); Srinivas Yerramalli, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/649,145

(22) Filed: Jan. 27, 2022

(65) Prior Publication Data

US 2022/0150965 A1    May 12, 2022

Related U.S. Application Data

(62) Division of application No. 16/394,851, filed on Apr. 25, 2019, now Pat. No. 11,265,917.

(Continued)

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | |
|---|---|---|
| 2014/0031031 A1 | 1/2014 | Gauvreau et al. |
| 2015/0049715 A1 | 2/2015 | Yerramalli et al. |

(Continued)

FOREIGN PATENT DOCUMENTS

| | | |
|---|---|---|
| EP | 3140945 A1 | 3/2017 |
| WO | WO-2015103632 A1 | 7/2015 |

(Continued)

OTHER PUBLICATIONS

International Preliminary Report on Patentability—PCT/US2019/029396, The International Bureau of WIPO—Geneva, Switzerland, dated Nov. 12, 2020.

(Continued)

*Primary Examiner* — Alex Skripnikov
(74) *Attorney, Agent, or Firm* — Arun Swain; Norton Rose Fulbright LLP

(57) ABSTRACT

Aligned listen before talk (LBT) gaps for single operator frame-based equipment (FBE) mode new radio (NR) shared spectrum (NR-SS) is disclosed. Within the FBE mode network, the base station determines a plurality of potential transmission bursts within a fixed frame period. The base station may then reserve a plurality of LBT gaps prior to the starting position of each such transmission burst. The base station communicates the location of each of the LBT gaps to all neighboring network entities and contends for access to the fixed frame period at the beginning of the frame regardless of whether it has data for transmission during the frame. Each neighboring base station that receives the LBT gaps locations will use the same locations in order to align the LBT gaps over the FBE mode network.

12 Claims, 10 Drawing Sheets

Related U.S. Application Data

(60) Provisional application No. 62/664,599, filed on Apr. 30, 2018.

(51) Int. Cl.
*H04W 72/0446* (2023.01)
*H04W 72/23* (2023.01)

(56) References Cited

U.S. PATENT DOCUMENTS

| | | |
|---|---|---|
| 2015/0326377 A1 | 11/2015 | Freda et al. |
| 2015/0349931 A1 | 12/2015 | Damnjanovic et al. |
| 2016/0100407 A1 | 4/2016 | Gaal et al. |
| 2016/0105858 A1 | 4/2016 | Damnjanovic et al. |
| 2016/0262188 A1 | 9/2016 | Zhang et al. |
| 2016/0302226 A1 | 10/2016 | Kim et al. |
| 2017/0223677 A1 | 8/2017 | Dinan et al. |
| 2019/0335500 A1 | 10/2019 | Zhang et al. |

FOREIGN PATENT DOCUMENTS

| | | |
|---|---|---|
| WO | WO-2015126782 A1 | 8/2015 |
| WO | WO-2017130764 A1 | 8/2017 |

OTHER PUBLICATIONS

International Search Report and Written Opinion—PCT/US2019/029396—ISA/EPO—dated Aug. 14, 2019.
Partial International Search Report—PCT/US2019/029396—ISA/EPO—dated Jun. 24, 2019.
European Search Report—EP22192208—Search Authority—The Hague—dated Nov. 15, 2022.

ALIGNED LBT GAPS FOR SINGLE OPERATOR FBE NR-SS

CROSS-REFERENCE TO RELATED APPLICATIONS

This application is a divisional and claims the benefit of U.S. patent application Ser. No. 16/394,851, entitled, "ALIGNED LBT GAPS FOR SINGLE OPERATOR FBE NR-SS," filed on Apr. 25, 2019, and also claims the benefit of U.S. Provisional Patent Application No. 62/664,599, entitled, "ALIGNED LBT GAPS FOR SINGLE OPERATOR FBE NR-SS," filed on Apr. 30, 2018, which are expressly incorporated by reference herein in their entirety.

BACKGROUND

Field

Aspects of the present disclosure relate generally to wireless communication systems, and more particularly, to aligned listen before talk (LBT) gaps for single operator frame based equipment (FBE) new radio (NR) shared spectrum (NR-SS) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a base station, a plurality of potential transmission bursts within a fixed frame period in a frame-based equipment (FBE) mode network, reserving, by the base station, a plurality of listen before talk (LBT) gaps before a starting position of each burst of the plurality of potential transmission bursts, communicating, by the base station, a location of the plurality of LBT gaps to one or more network entities connected for communication on the FBE mode network, and contending, by the base station, for access to the fixed frame period at a beginning of the fixed frame period.

In an additional aspect of the disclosure, a method of wireless communication includes receiving, by a UE from a serving base station, a location of a plurality of LBT gaps within a fixed frame period on a FBE mode network, refraining, by the UE, from transmissions during the location of the plurality of LBT gaps, and detecting, by the UE, a common control signal from the serving base station at a beginning of the fixed frame period, wherein the common control signal identifies the fixed frame period is available for transmission according to an uplink-downlink configuration.

In an additional aspect of the disclosure, an apparatus configured for wireless communication is disclosed. The apparatus includes means for determining, by a base station, a plurality of potential transmission bursts within a fixed frame period in a FBE mode network, means for reserving, by the base station, a plurality of LBT gaps before a starting position of each burst of the plurality of potential transmission bursts, means for communicating, by the base station, a location of the plurality of LBT gaps to one or more network entities connected for communication on the FBE mode network, and means for contending, by the base station, for access to the fixed frame period at a beginning of the fixed frame period.

In an additional aspect of the disclosure, an apparatus configured for wireless communication is disclosed. The apparatus includes means for receiving, by a UE from a serving base station, a location of a plurality of LBT gaps within a fixed frame period on a FBE mode network, means for refraining, by the UE, from transmissions during the location of the plurality of LBT gaps, and means for detecting, by the UE, a common control signal from the serving base station at a beginning of the fixed frame period, wherein the common control signal identifies the fixed frame period is available for transmission according to an uplink-downlink configuration.

In an additional aspect of the disclosure, a non-transitory computer-readable medium having program code recorded thereon. The program code further includes program code executable by a computer for causing the computer to determine, by a base station, a plurality of potential transmission bursts within a fixed frame period in a FBE mode network, program code executable by the computer for causing the computer to reserve, by the base station, a plurality of LBT gaps before a starting position of each burst of the plurality of potential transmission bursts, program code executable by the computer for causing the computer to communicate, by the base station, a location of the plurality of LBT gaps to one or more network entities connected for communication on the FBE mode network, and program code executable by the computer for causing the computer to contend, by the base station, for access to the fixed frame period at a beginning of the fixed frame period.

In an additional aspect of the disclosure, the non-transitory computer-readable medium of wireless communication is disclosed. The program code includes program code executable by the computer for causing the computer to receive, by a UE from a serving base station, a location of a plurality of LBT gaps within a fixed frame period on a FBE mode network, program code executable by the computer for causing the computer to refrain, by the UE, from transmissions during the location of the plurality of LBT gaps, and program code executable by the computer for causing the computer to detect, by the UE, a common control signal from the serving base station at a beginning of the fixed frame period, wherein the common control signal identifies the fixed frame period is available for transmission according to an uplink-downlink configuration.

In an additional aspect of the disclosure, an apparatus configured for wireless communication is disclosed. The apparatus includes at least one processor; and a memory coupled to the at least one processor. The processor is configured to determine, by a base station, a plurality of potential transmission bursts within a fixed frame period in a FBE mode network, to reserve, by the base station, a plurality of LBT gaps before a starting position of each burst of the plurality of potential transmission bursts, to communicate, by the base station, a location of the plurality of LBT gaps to one or more network entities connected for communication on the FBE mode network, and to contend, by the base station, for access to the fixed frame period at a beginning of the fixed frame period.

In an additional aspect of the disclosure, an apparatus configured for wireless communication is disclosed. The apparatus includes at least one processor, and a memory coupled to the at least one processor. The processor is configured to receive, by a UE from a serving base station, a location of a plurality of LBT gaps within a fixed frame period on a FBE mode network, to refrain, by the UE, from transmissions during the location of the plurality of LBT gaps, and to detect, by the UE, a common control signal from the serving base station at a beginning of the fixed frame period, wherein the common control signal identifies the fixed frame period is available for transmission according to an uplink-downlink configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
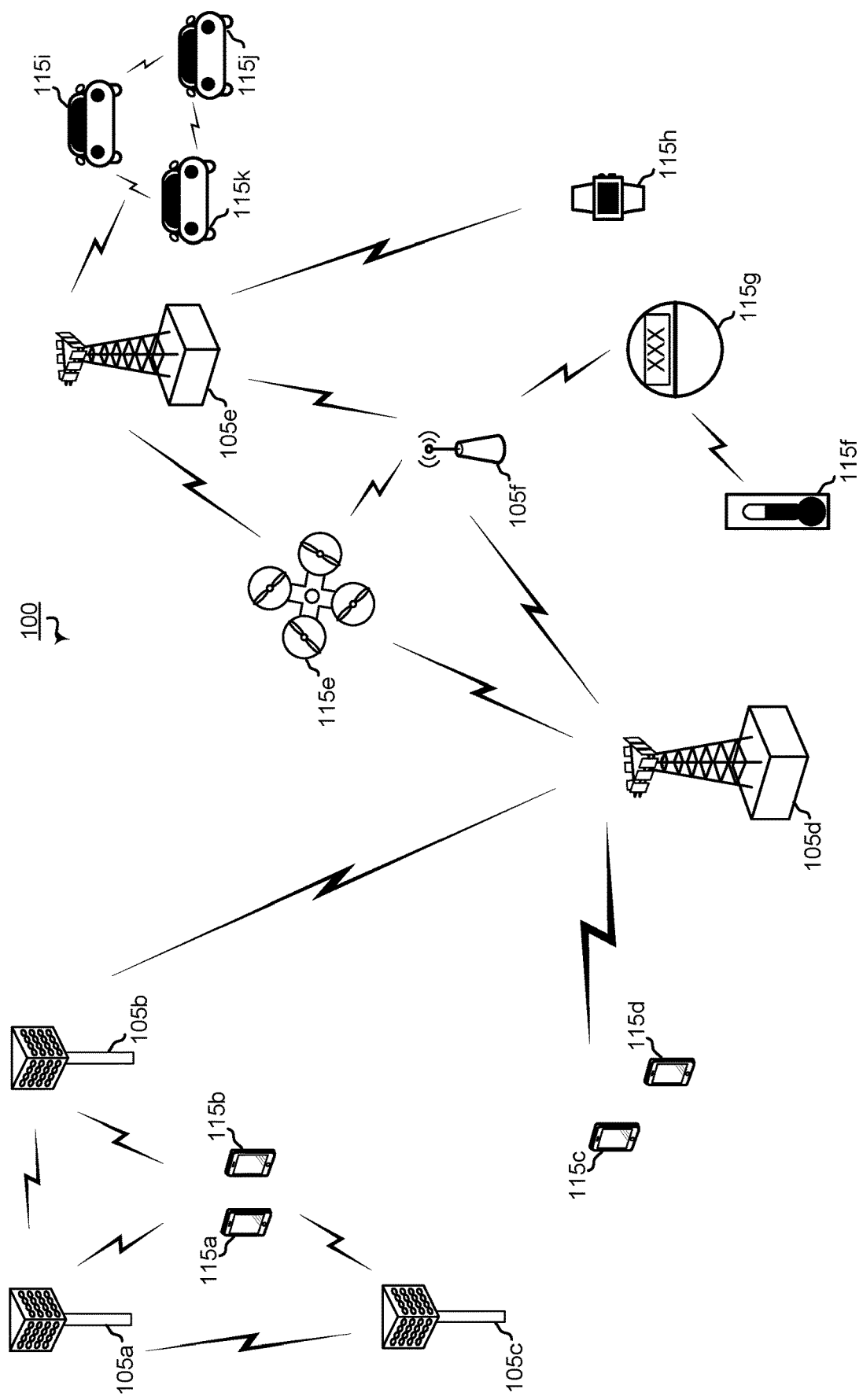
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
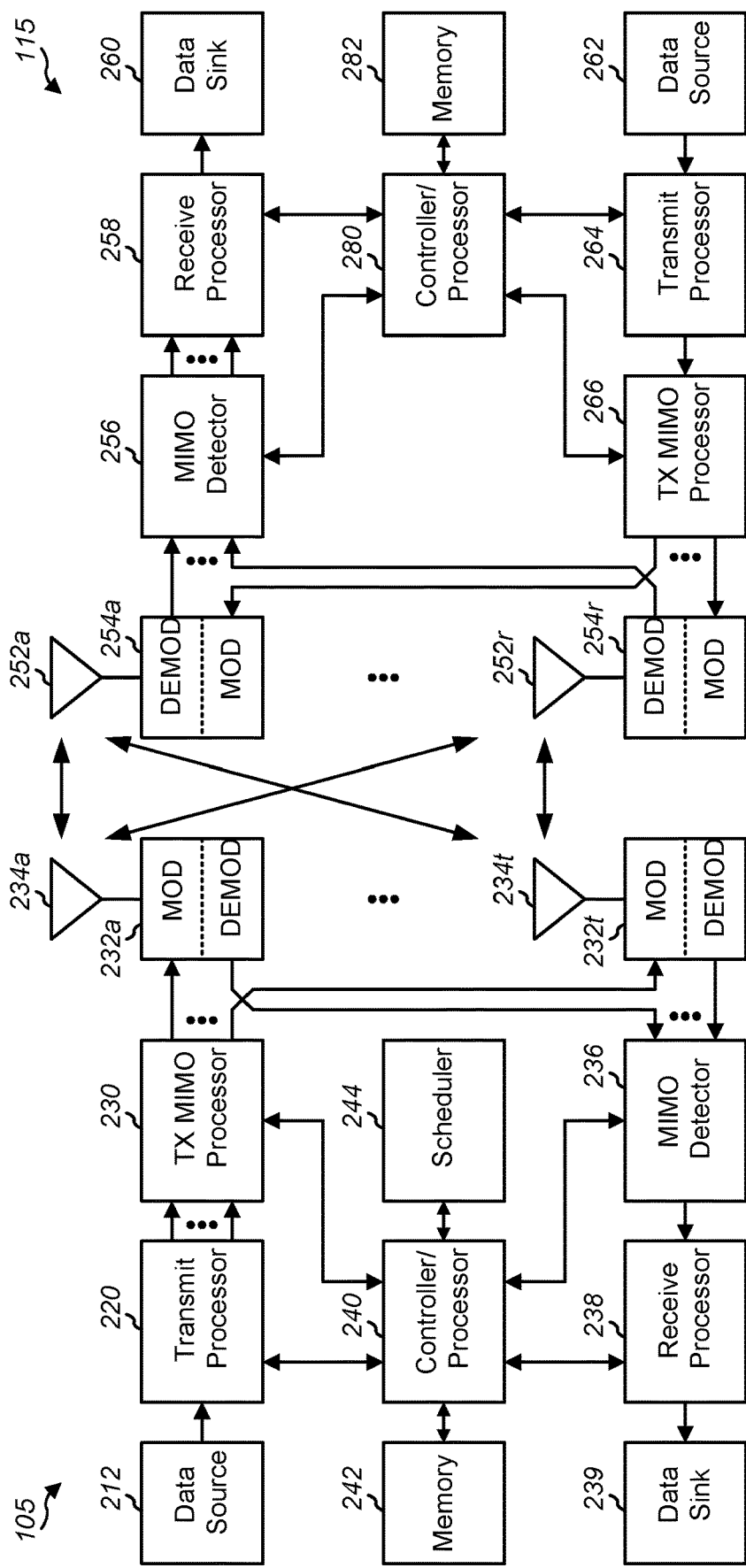
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
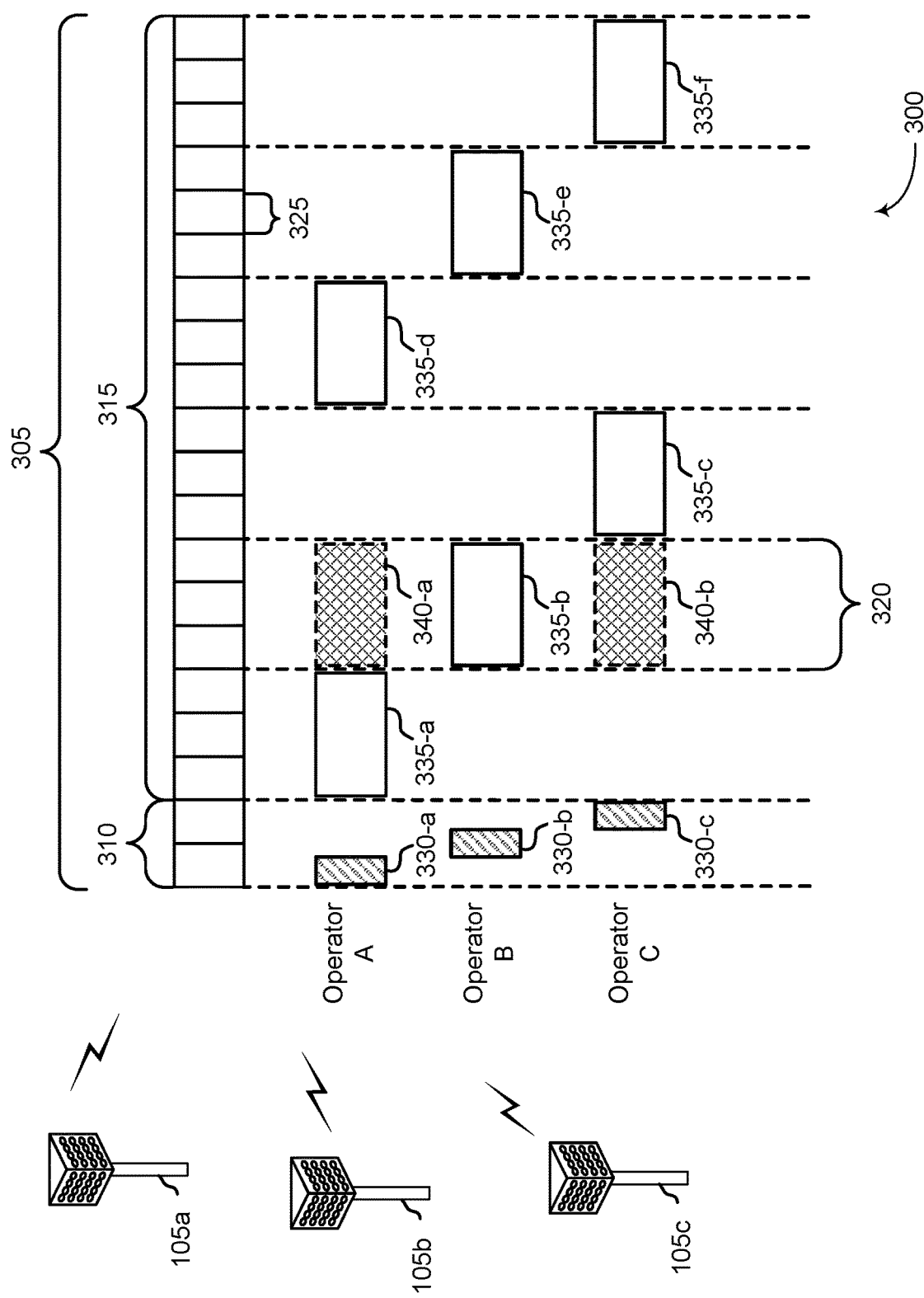
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Different regions may have different regulatory requirements for communication operations over an unlicensed band. Some regulations may mandate the equipment operating on unlicensed spectrum to implement an LBT procedure, such as by performing a clear channel assessment (CCA), before starting a transmission to verify that the operating channel is not occupied. On the unlicensed 5 GHz band, two of modes of operation have been suggested: frame-based equipment (FBE), and load-based equipment (LBE).

FBE is the equipment in which the transmit/receive structure may not be directly demand-driven, but, instead, operates according to fixed timing. LBT/CCA may therefore be performed periodically at predefined time instances according to a predetermined frame structure, such as:

$$\text{Fixed-Frame Period} = \text{channel occupancy time } (CoT) + \text{idle period} \quad (1)$$

Where the fixed frame period (e.g., 1-10 ms) represents the periodicity over which the LBT/CCA may be performed, the CoT represents the total time during which equipment has transmissions during the fixed-frame period on a given channel without re-evaluating the availability of that channel, and the idle period represents the total time within the fixed-frame period, during which the equipment has no transmissions. Some regulations provide that the idle period should be at least 5% of the channel occupancy time in any given fixed-frame period. If the equipment finds the operating channel(s) to be clear, it may then transmit immediately. Otherwise, if the equipment finds the operating channel occupied, it would not transmit on that channel during the remainder of the current fixed-frame period.

Unlike for FBE, load-based equipment is not restricted to perform LBT/CCA according to a fixed frame structure. Instead, LBE may perform LBT/CCA on an ad hoc basis, whenever it has data to transmit. Before a transmission on an operating channel, an LBE would perform a CCA to detect the energy on the channel. If the equipment finds the operating channel(s) to be clear, it may transmit immediately. The total time that an LBE makes use of an operating channel is the maximum channel occupancy time (MCOT). In one example implementation, MCOT may be less than $(13/32) \times q$ milliseconds, where $q=\{4 \ldots 32\}$. (E.g., when $q=32$, the MCOT=13 ms). Otherwise, if the equipment finds an operating channel occupied, it will not immediately transmit on the channel, but will perform an Extended CCA (ECCA) at a later time during the MCOT. For example, the LBE would observe the operating channel for the duration of a random factor N multiplied by the CCA observation time. N represents the number of clear idle slots resulting in a total idle period that the LBE would observe before initiation of the transmission. The value of N may be randomly selected in the range $1 \ldots q$ every time an ECCA is to be performed. N may be stored in a counter which is decremented every time a CCA slot is considered to be "unoccupied". When the counter reaches zero, the LBT may transmit.

5G technologies include provision for an Internet of Things (IoT) functionality that allows structured communications over licensed and unlicensed spectrum by multiple dedicated UEs, which may be lower power, single purposes devices (measurement instruments, appliances, industrial equipment, and the like). When implemented for industrial IoT, there may be a single operator environment, for which an FBE-mode of operation may be beneficial.

In FBE-mode operations, if a base station does not contend for access at the beginning of a frame, it may not be able to contend in the middle of the frame thereafter. Thus, without the ability to grab a communication channel in the middle of a designated frame, such FBE-mode operations could not handle urgent traffic, such as ultra-reliable low latency communication (URLLC) traffic.

In addition, an opportunistic frequency switching has been proposed for FBE-mode operations, in which a base station may switch to another frequency when the current frequency suffers from interference. If a served UE does not decode any common signal from the base station, the UE will retune to another carrier frequency and monitor for common signaling on the other frequency. Additional UE complexity may be created if a given base station does not send common signaling at the beginning of a frame. Various aspects of the present disclosure are directed providing aligned LBT gaps and having base stations contend for and transmit short downlink control signaling at the beginning of frame, even if there is no current traffic need. The base station may not know there will be arrival of traffic later on in the fixed-frame period.

Figure 4:
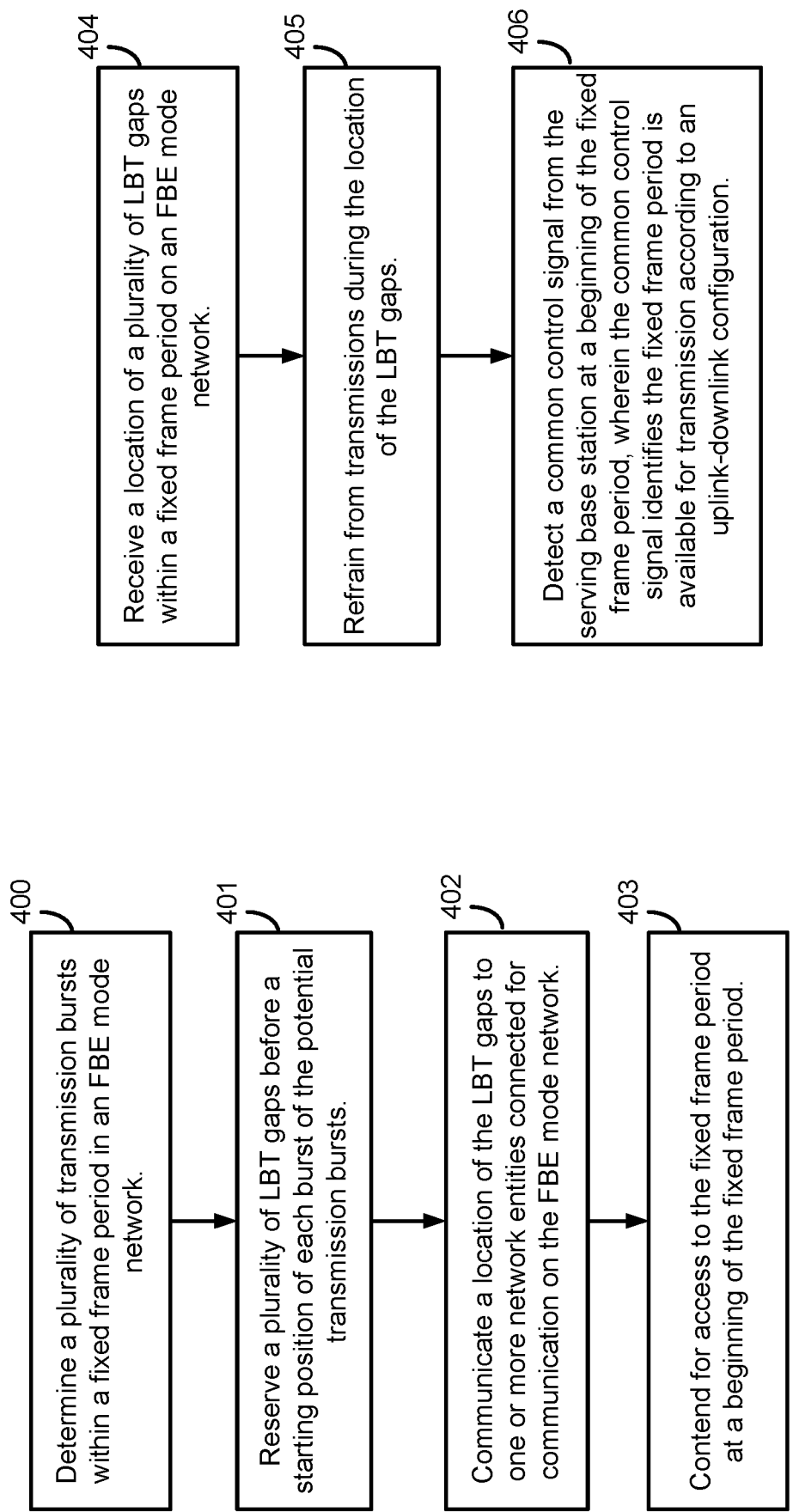
FIGS. 4A and 4B are block diagrams illustrating example blocks executed to implement one aspect of the present disclosure.
Figure 9:
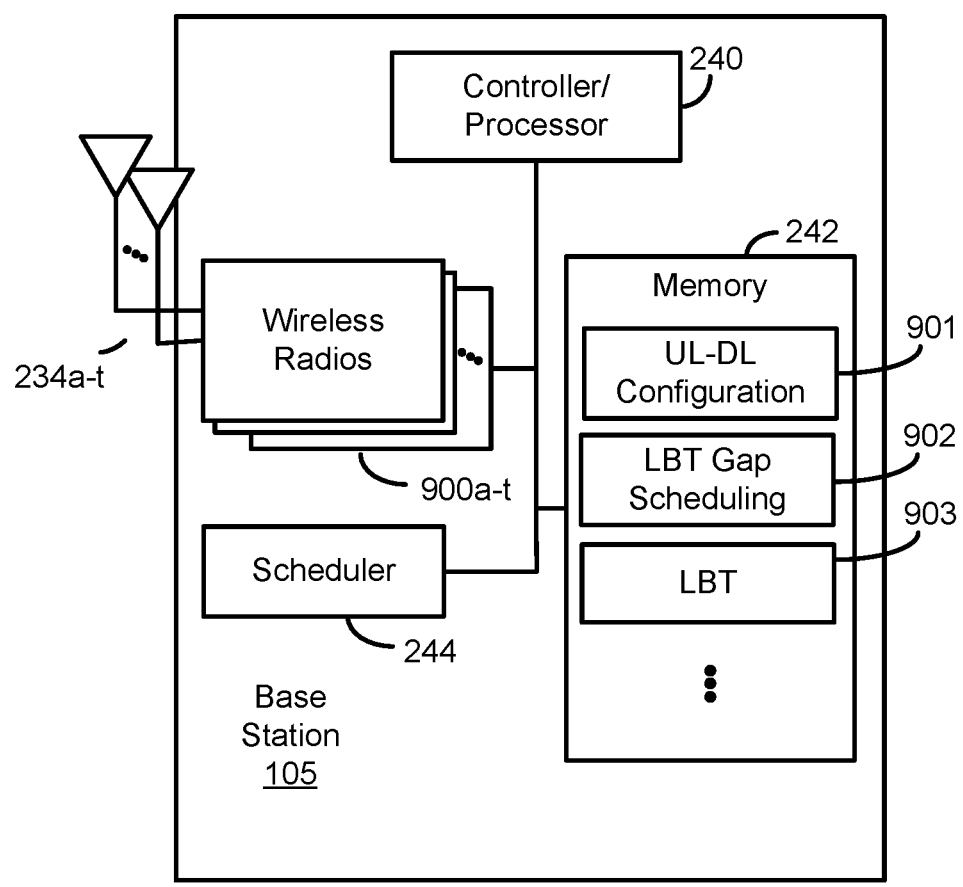
FIG. 9 is a block diagram illustrating base station configured according to one aspect of the present disclosure.

FIG. 4A is a block diagram illustrating example blocks executed by a base station to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 400, a base station determines a plurality of potential transmission bursts within a fixed frame period in an FBE mode network. Within the fixed frame period, there may be many opportunities for transmission bursts, including both downlink and uplink transmission bursts. The base station, such as base station 105, may determine an uplink-downlink configuration 901 for the potential transmission bursts that schedules transmission locations or slots within which a transmission burst may be made. Base station 105 stores the determined uplink-downlink configuration 901 in memory 242.

At block 401, the base station reserves a plurality of LBT gaps before a starting position of each burst of the plurality of potential downlink-uplink bursts. Before transmissions on the operating channel, each transmitting entity will perform an LBT procedures (e.g., a regular or abbreviated LBT). Base station 105, under control of controller/processor 240, executes LBT gap scheduling logic 902, stored in memory 242. The execution environment of LBT gap scheduling logic 902 allows for scheduler 244 to schedule the locations of the LBT gaps prior to each potential transmission burst location. After determining the potential transmission bursts and uplink-downlink configuration, base station 105, under control of controller/processor 240 and scheduler 244, may reserve locations for LBT gaps before each potential transmission burst location.

At block 402, the base station communicates a location of the plurality of LBT gaps to one or more network entities connected for communication on the FBE mode network. As a part of the system information, base station 105 would communicate the location of the LBT gaps and uplink-downlink configuration 901 via wireless radios 900a-t and antennas 234a-t. Communication of the gaps allows any transmitting entity knowledge of the gap in order to perform the LBT prior to its transmission burst.

At block 403, the base station contends for access to the fixed frame period at a beginning of the fixed frame period. Base station 105, under control of controller/processor 240 executes LBT logic 903, stored in memory 242. The execution environment of LBT logic 903 provides for appropriate energy/preamble detection to be performed in order to detect whether or not the channel is occupied. After performing a successful LBT procedure during the idle period of the previous fixed frame period, base station 105 will contend for access at the beginning of the fixed frame period and transmit a common control signal indicating that the channel is available for communication. Base station 105 contends for access regardless of whether it has data or knows of data to be communicated later in the fixed frame period.

Figure 10:
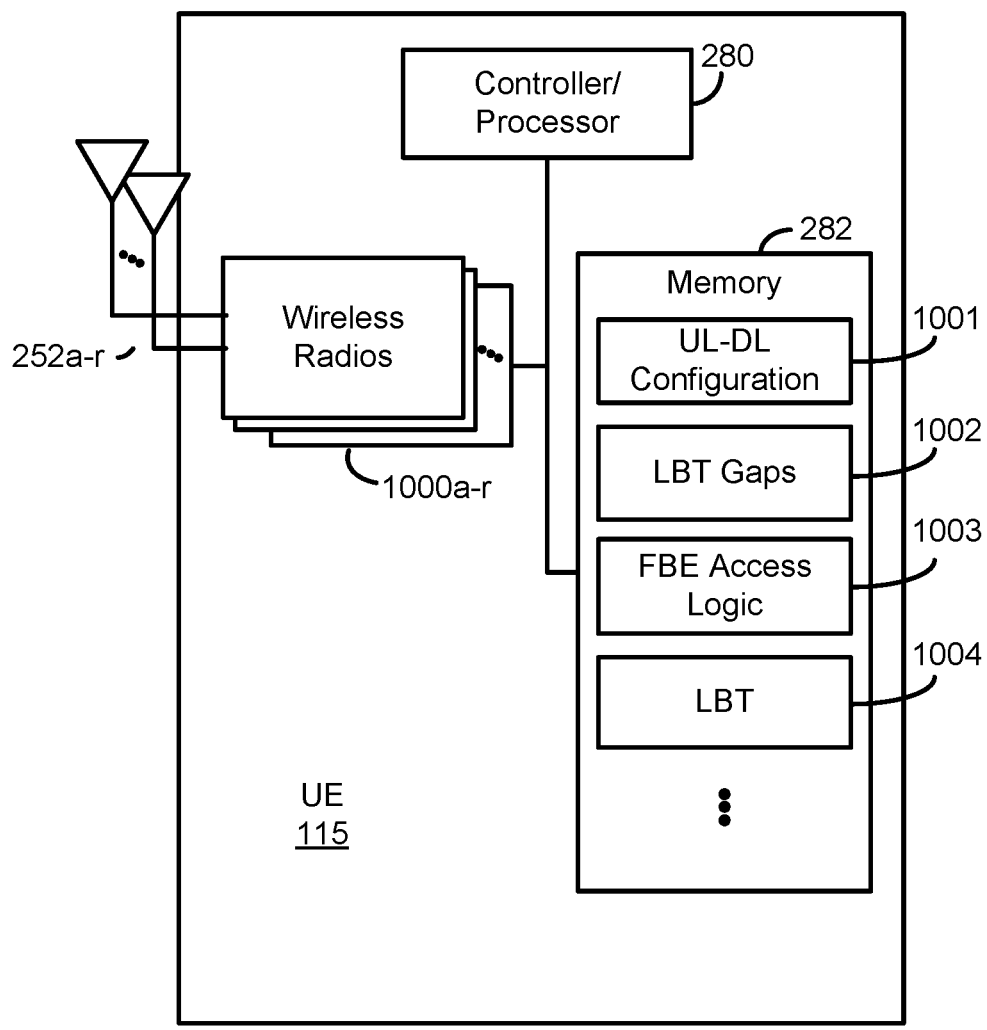
FIG. 10 is a block diagram illustrating UE 115 configured according to one aspect of the present disclosure.

FIG. 4B is a block diagram illustrating example block executed by a UE to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266.

At block 404, a UE receives a location of a plurality of LBT gaps within a fixed frame period on a FBE mode network. For a UE, such as UE 115, within the FBE-mode operation of the network, it will receive signals via antennas 252a-r and wireless radios 1000a-r that identify a location of LBT gaps prior to each potential transmission burst location in the fixed-frame period. UE 115 stores record of the gaps in memory 282, at LBT gaps 1002. If UE 115 were scheduled for uplink transmission during one of the uplink portions or slots of the fixed-frame period as indicated by uplink-downlink configuration 1001, stored in memory 282, it would perform LBT during the gap prior to transmission. UE 115, under control of controller/processor 282, would execute LBT logic 1004. The execution environment of LBT logic 1004 provides for UE 115 to perform the energy/preamble detection process, as described above, in order to complete an LBT procedure. The location of the LBT gaps may be received in a form of a map of locations or via a set of resources for rate matching around.

At block 405, the UE refrains from transmissions during the location of the plurality of LBT gaps. With the location of each LBT gap, in order to preserve the gaps for LBT by transmitting entities, each network entity would refrain from transmissions during the LBT gap identified by the received location. UE 115, under control of controller/processor 280, would refrain either by using a map of the gaps within which it would not transmit or would identify resources around which it would rate match in LBT gaps 1002 and, thus, not transmit.

At block 406, the UE detects a common control signal from the serving base station at a beginning of the fixed frame period, wherein the common control signal identifies the fixed frame period is available for transmission according to an uplink-downlink configuration. UE 115, under control of controller/processor 280, executes FBE access logic 1003, stored in memory 282. The execution environment of FBE access logic 1003 provides for UE 115 to listen, via antennas 252*a-r* and wireless radios 1000*a-r*, at the beginning of each fixed frame period to detect for the common signaling from the serving base station. If UE 115 detects the common signaling, it is aware that communications may occur during the fixed frame period. Otherwise, UE 115, under control of controller/processor 280, would retune to a different frequency known within the execution environment of FBE access logic 1003 as part of the network. UE 115 would monitor again on the new frequency for the common signaling.

Figure 5:
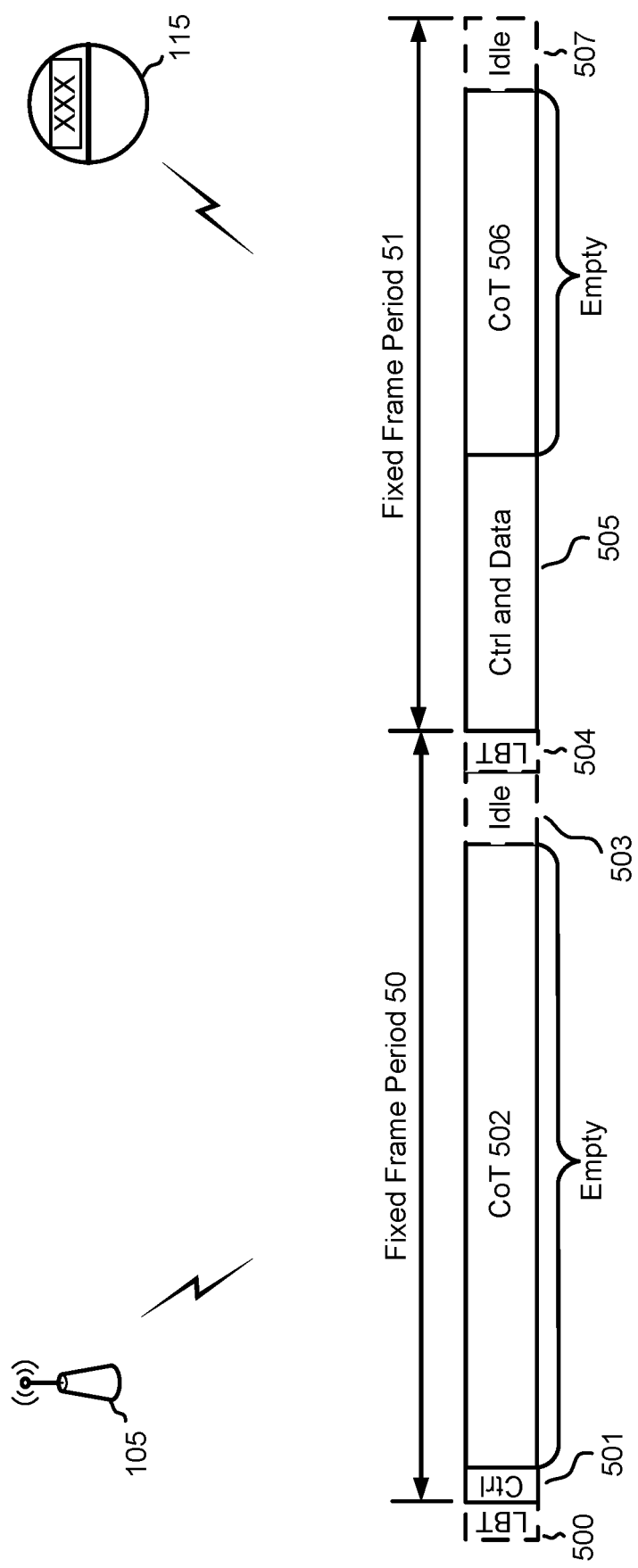
FIG. 5 is a block diagram illustrating a base station and UE configured according to one aspect of the present disclosure.

FIG. 5 is a block diagram illustrating a base station 105 and UE 115 configured according to one aspect of the present disclosure. In the illustrated example, base station 105 and UE 115 are within a single operator environment operating in FBE mode. Within the idle period prior to fixed frame period 50, base station 105 performs LBT 500 to determine whether or not the operating channel is occupied. After detecting success of LBT 500, base station 105 contends for the operating channel and transmits a common control signal 501. Common control signal 501 indicates that base station 105 has secured access to the operating channel and that the operating channel is available for communications with the served UEs, including UE 115. However, base station 105 does not have any data for downlink transmission to any of the served UEs, including UE 115. According to the present aspect, even though base station 105 has no data for transmission, it would still perform LBT 500 securing access to the operating channel and communications during fixed frame period 50.

Fixed frame period 50 includes CoT 502, which remains mostly empty because of the lace of data, and idle period 503. Base station 105 will perform LBT 504 during idle time 503 in order to detect channel occupancy for fixed frame period 51. After CoT 502, base station 105 obtains data scheduled for downlink to UE 115. Once success is detected for LBT 504, base station 105 contends for the operating channel again during fixed frame period 51 and transmits common control and data 505. Common control and data 505 includes the common control signaling that, again, identifies to neighboring network entities that the operating channel is open for communication during fixed frame period 51. It also includes the downlink data identified for UE 115. The empty portion of CoT 506 is smaller in fixed frame period 51 than fixed frame period 50 because of the data available for downlink transmission by base station 105. After CoT 506, fixed frame period 51 ends with idle period 507.

It should be noted that, while not shown, base station 105 would again perform an LBT procedure during idle period 507 to contend for access during the next fixed frame period regardless of whether there is any data at base station 105 or known to be received by base station 105 for downlink transmissions to any of its served UEs, including UE 115. According to the various aspects of the present disclosure, base station 105 would attempt access to the operating channel for each fixed frame period regardless of having any data for transmission.

Figure 6:
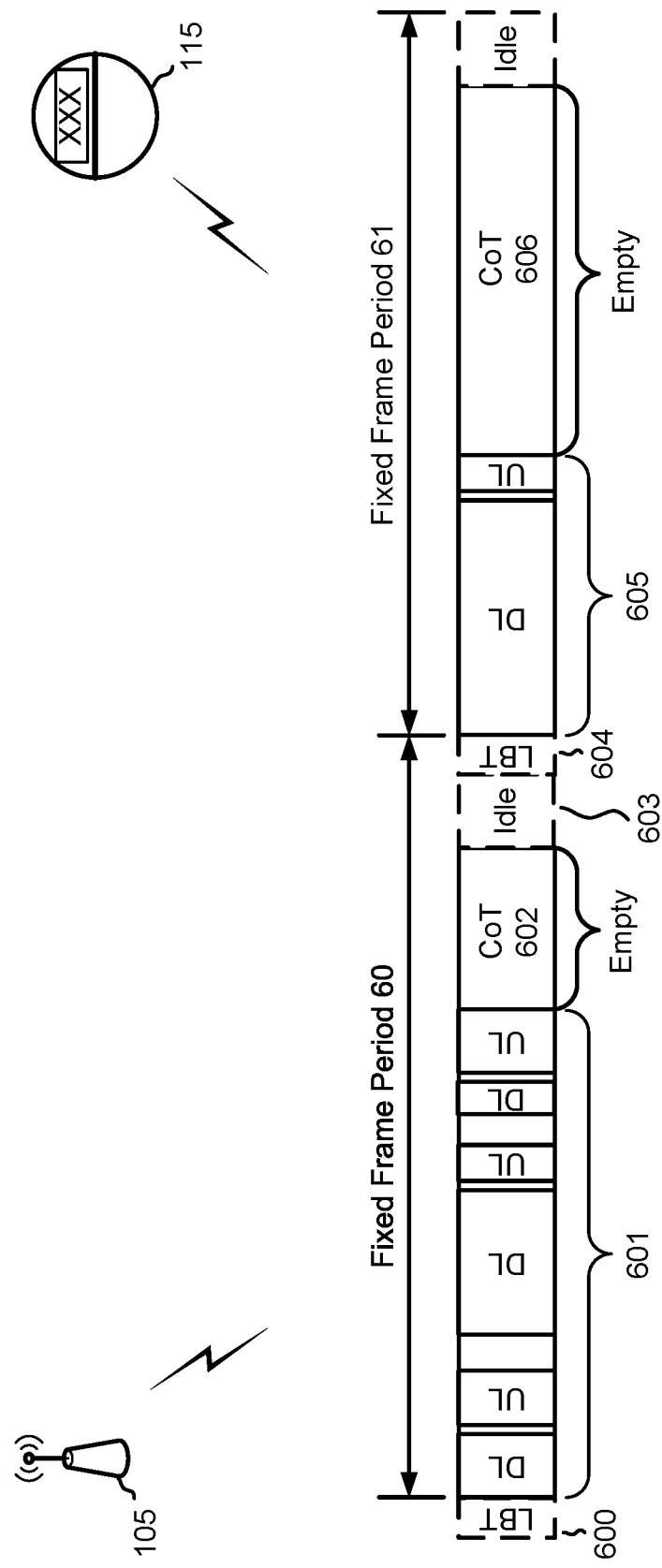
FIG. 6 is a block diagram illustrating a base station and UE operating in FBE mode.

FIG. 6 is a block diagram illustrating a base station 105 and UE 115 operating in FBE mode. Within each fixed frame period of FBE operations, there may be multiple transmission burst occasions, including downlink and uplink transmission bursts. In order to efficiently organize each fixed frame period, such as fixed frame periods 60 and 61, base station 105 may determine an uplink-downlink configuration, which sets different transmission units, portions, or slots of the fixed frame period identified for either uplink or downlink transmission bursts. The uplink-downlink configuration may further be set by base station 105 based on scheduled communications that are known. For example, in fixed frame period 60, base station 105 schedules uplink-downlink configuration 601 within CoT 602, while it schedules uplink-downlink configuration 605 within CoT 606 of fixed frame period 61. In order to maintain access to the operating channel, base station 105 would perform LBT 604 during idle period 603 of fixed frame period 60 to secure access during fixed frame period 61.

Figure 7:
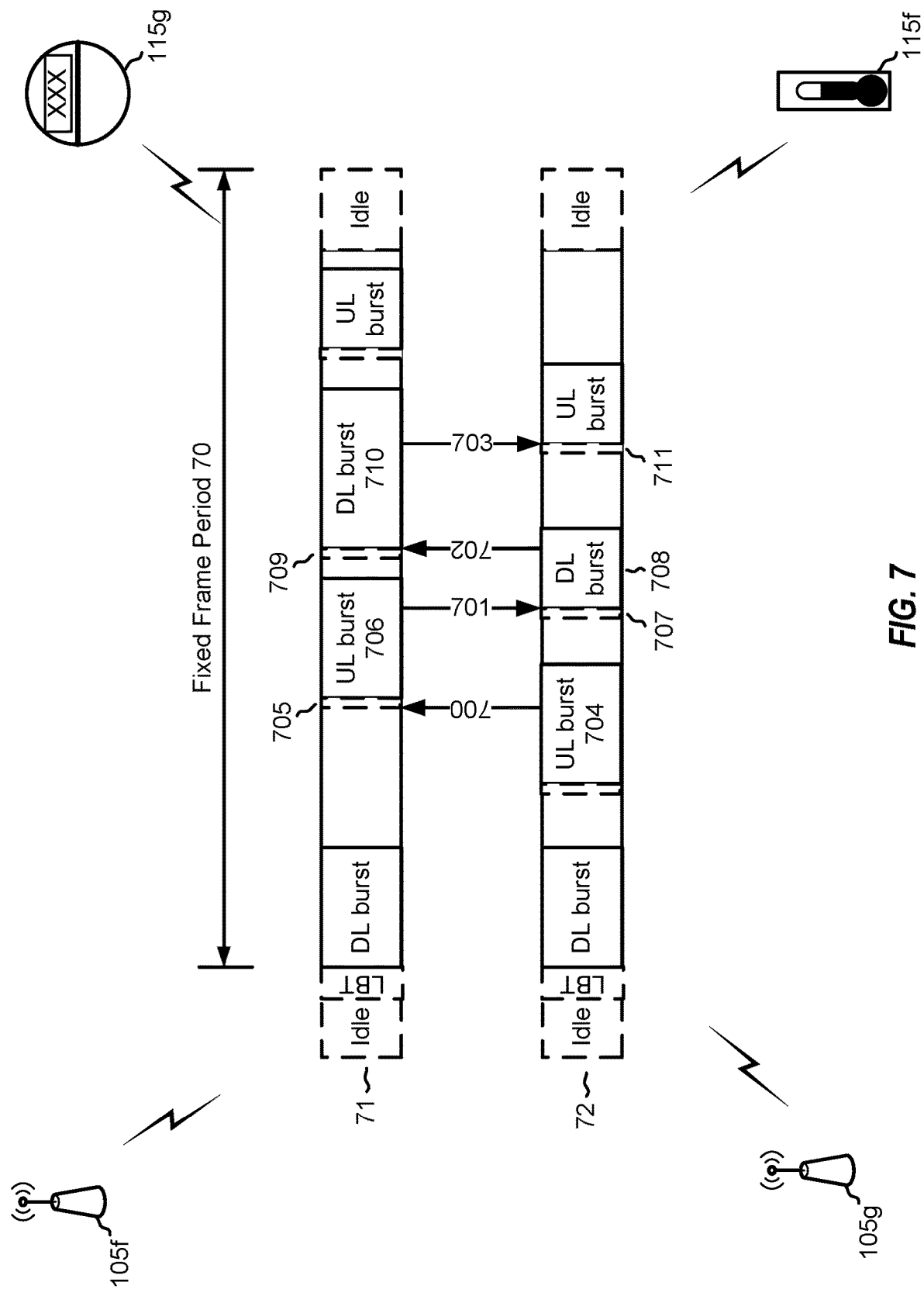
FIG. 7 is a block diagram illustrating base stations in communication with UEs, each of which is configured according to one aspect of the present disclosure.

FIG. 7 is a block diagram illustrating base stations 105*f* and 105*g* in communication with UEs 115*g* and 115*f*, respectively, each of which is configured according to one aspect of the present disclosure. Base stations 105*f* and 105*g* operate within the same industrial facility and are synchronized to each other, but each maintains its own communication scheduling. Transmission stream 71 includes the transmissions between base station 105*f* and UE 115*g*, while transmission stream 72 includes the transmission between base station 105*g* and UE 115*f*. The illustrated communications between the entities cover fixed frame period 70 for both transmission streams 71 and 72. In FBE operations, each network entity that will transmit within any given fixed frame period would perform an LBT procedure (e.g., regular or one shot LBT) for each transmission burst in CoT. With multiple uplink-downlink transmission bursts within fixed frame period 70 over both transmission streams 71 and 72, consideration should be made to avoid blocking, such as base station to base station blocking, base station to UE blocking, or UE to UE blocking due to LBT. Thus, prior to each transmission burst, the transmitting entity will perform an LBT. A gap for these LBT may be included in the scheduling and configuration of the frame.

In a multi-cell deployment, such as with base stations 105*f* and 105*g*, the different uplink-downlink configurations, each having reserved LBT gaps prior to the burst location may result in transmissions of one cell colliding with transmissions of another. For example, uplink burst 704 from UE 115*f* collides at 700 with the attempted LBT of UE 115*g* during gap 705. Similarly, uplink burst 706 from UE 115*g* would collide at 701 with an LBT attempt by base station 105*g* in gap 707. Downlink burst 708 by base station 105*g* would collide at 702 with an LBT attempt by base station 105*f* at gap 709, and downlink burst 710 by base station 105*f* would collide with an LBT attempt by UE 115*f* at gap 711. Accordingly, without greater coordination between cells (base stations 105*g* and 105*g*) colliding communications may cause low efficiency communications. UE to base station or base station to UE interference is also possible when the deployment is too dense (e.g., energy detection above a threshold due to signals from a neighbor cell). For a dense factory deployment, base station to base station interference may also be problematic.

It should be noted that within a single cell deployment, the LBT gaps can be easily guaranteed. Between each downlink to uplink and uplink to downlink switching point, a gap is scheduled. For downlink to uplink transitions, there may already be a gap scheduled in NR deployments. For uplink to downlink transitions or TDM uplink transmissions, there may be no gap in NR deployments, but various aspects of the present disclosure may provide for such gaps to be defined.

Figure 8:
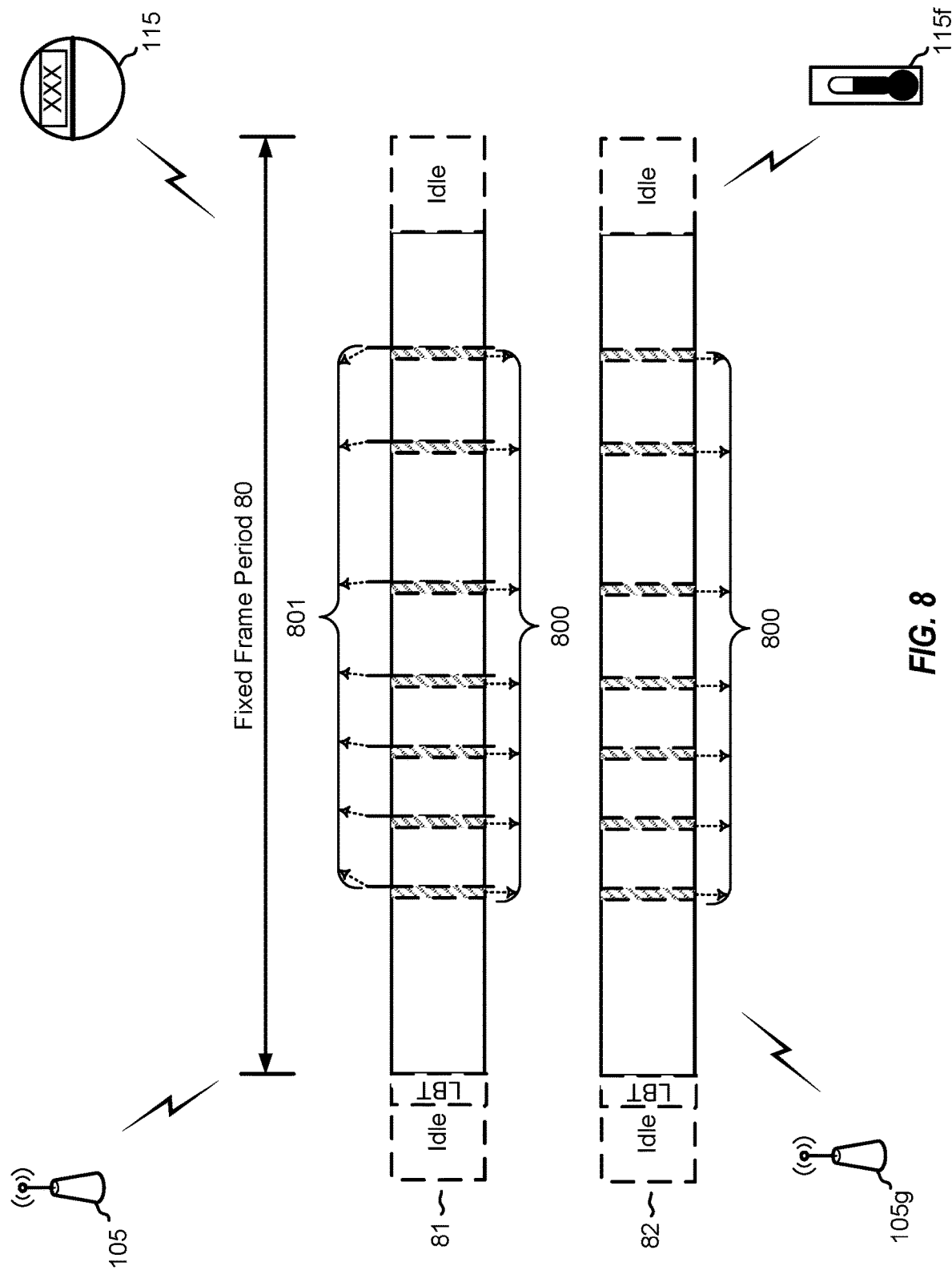
FIG. 8 is a block diagram illustrating base stations and UEs configured according to one aspect of the present disclosure.

FIG. 8 is a block diagram illustrating base stations 105 and 105g and UEs 115 and 115f configured according to one aspect of the present disclosure. Base stations 105/105g and UEs 115/115f operated within an FBE-mode environment. In order to avoid colliding communications between different cells, when operating in such a multiple-cell environment, each LBT gap scheduled within a fixed frame period, such as fixed frame period 80, will be aligned across base stations 105 and 105g. As illustrated, based on the potential transmission bursts available in fixed frame period 80, base station 105 defines an uplink-downlink configuration in transmission stream 81 that identifies the starting points 801 of each transmission unit or slot (e.g., each uplink or downlink occasion). LBT gaps 800 are also scheduled prior to the respective starting point 801. LBT gaps 800 are also scheduled across transmission stream 82, between base station 105g and UE 115f. LBT gaps 800 are aligned between transmission streams 81 and 82. Thus, collisions of competing signals between the base station 105-UE 115 pair and base station 105g-UE 115f pair would be avoided.

In order to communicate the alignment of LBT gaps 800, base station 105 may broadcast or transmit not only the uplink-downlink configuration for fixed frame period 80, but the locations of LBT gaps 800. This information may be received by both served UE 115 and neighbor UE 115f, and neighbor base station 105g. Therefore, all neighboring base stations, including base station 105 and 105g, would follow the same pattern for LBT gaps 800 for RRC configured transmission and grants. That configuration of LBT gaps 800 may still change over time, but all base stations within the area would change configurations at the same time.

It should be noted that, in order to avoid cross link interference (e.g., UE 115 uplink transmission interfering with downlink transmissions to UE 115f), both base station 115 and 115g may maintain the same uplink-downlink configuration as well. The uplink-downlink pattern can be regular or irregular, as selected by base station 115.

It should further be noted that no gap may be needed within one downlink burst, while a gap may be needed between multiple TDM uplink transmissions.

Communication of the location of LBT gaps 800 by base station 105 may be made using system information broadcasts (e.g., MIB, SIBs, etc.) or may be semi-statically transmitted using RRC communications or other transmission grants. In such implementations, base station 105 would transmit the direct location/scheduling of LBT gaps 800 within fixed frame period 80. In additional aspects of the present disclosure, the location of LBT gaps 800 may be implicitly communicated by base station 105 via signaling of resources for rate matching. NR networks have both symbol-RB level rate matching and RE-level rate matching capabilities. Symbol-RB level rate matching of a resource set may be supported by a bitmap (e.g., 2-bits, 3-bits, etc.). RE-level rate matching is currently defined for LTE CRS transmission. Both of these NR rate matching functions are for PDSCH rate matching, and while uplink rate matching (e.g., PUSCH, etc.) is not covered, uplink rate matching may also be considered assuming the scheduler has sufficient capabilities.

In single operator FBE mode environment, the concept of aligned LBT gaps across base stations is suggested in the various aspects of the present disclosure. As noted above, the scheduler may enforce LBT gaps 800 by including scheduling of the gaps in all RRC configurations and transmission grants. Alternatively, various aspects of the present disclosure may provide for a symbol-level rate matching resource set that is configured to the UE, such as to UE 115, and all other configured or granted transmission/reception will rate match around those symbols of the signaled resource set, in both downlink and uplink transmission bursts. This applies to both DL and UL transmissions. In such an implementation, RRC signaling (e.g., cell-specific or UE-specific) or dynamic L1 signaling in DCI (downlink control information) may be used by base station 105 to indicate the symbols to rate match around within fixed frame period 80. Thus, each of served UE 115 and neighboring network entities, base station 105g and UE 115f would have the specific symbols around which to rate match in order to leave LBT gaps 800.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE) from a serving base station, a location of a plurality of LBT gaps within a fixed frame period on a frame-based equipment (FBE) mode network;
refraining, by the UE, from transmissions during the location of the plurality of LBT gaps; and
detecting, by the UE, a common control signal from the serving base station at a beginning of the fixed frame period, wherein the common control signal identifies the fixed frame period is available for transmission according to an uplink-downlink configuration.

2. The method of claim 1, further including:
identifying, by the UE, data for uplink transmission;
performing, by the UE, a listen before talk (LBT) procedure at a gap of the plurality of LBT gaps associated with an uplink transmission segment of the uplink-downlink configuration; and
transmitting, by the UE, the data in the uplink transmission segment in response to success of the LBT procedure.

3. The method of claim 1, wherein the receiving the location includes one of:
receiving a gap pattern identifying the location of the plurality of LBT gaps in the fixed frame period; or
receiving identification of a set of transmission resources in the fixed frame period, wherein the refraining from transmissions includes rate matching around the set of transmission.

4. An apparatus configured for wireless communication, the apparatus comprising:
at least one processor; and
a memory coupled to the at least one processor;
wherein the at least one processor is configured to:
receive, by a user equipment (UE) from a serving base station, a location of a plurality of LBT gaps within a fixed frame period on a frame-based equipment (FBE) mode network;
refrain, by the UE, from transmissions during the location of the plurality of LBT gaps; and
detect, by the UE, a common control signal from the serving base station at a beginning of the fixed frame period, wherein the common control signal identifies the fixed frame period is available for transmission according to an uplink-downlink configuration.

5. The apparatus of claim 4, further including configuration of the at least one processor to:
identify, by the UE, data for uplink transmission;
perform, by the UE, a listen before talk (LBT) procedure at a gap of the plurality of LBT gaps associated with an uplink transmission segment of the uplink-downlink configuration; and
transmit, by the UE, the data in the uplink transmission segment in response to success of the LBT procedure.

6. The apparatus of claim 4, wherein the configuration of the at least one processor to receive the location includes configuration of the at least one processor to one of:
receive a gap pattern identifying the location of the plurality of LBT gaps in the fixed frame period; or
receive identification of a set of transmission resources in the fixed frame period, wherein the configuration of the at least one processor to refrain from transmissions includes rate matching around the set of transmission.

7. A non-transitory computer-readable medium having program code recorded thereon, the program code including program code executable by a computer for causing the computer to:
- receive, by a user equipment (UE) from a serving base station, a location of a plurality of LBT gaps within a fixed frame period on a frame-based equipment (FBE) mode network;
- refrain, by the UE, from transmissions during the location of the plurality of LBT gaps; and
- detect, by the UE, a common control signal from the serving base station at a beginning of the fixed frame period, wherein the common control signal identifies the fixed frame period is available for transmission according to an uplink-downlink configuration.

8. The non-transitory computer-readable medium of claim 7, wherein the program code further includes program code for causing the computer to:
- identify, by the UE, data for uplink transmission;
- perform, by the UE, a listen before talk (LBT) procedure at a gap of the plurality of LBT gaps associated with an uplink transmission segment of the uplink-downlink configuration; and
- transmit, by the UE, the data in the uplink transmission segment in response to success of the LBT procedure.

9. The non-transitory computer-readable medium of claim 7, wherein the program code for causing the computer to receive the location includes program code for causing the computer to one of:
- receive a gap pattern identifying the location of the plurality of LBT gaps in the fixed frame period; or
- receive identification of a set of transmission resources in the fixed frame period, wherein the configuration of the at least one processor to refrain from transmissions includes rate matching around the set of transmission.

10. An apparatus configured for wireless communication, the apparatus comprising:
- means for receiving, by a user equipment (UE) from a serving base station, a location of a plurality of LBT gaps within a fixed frame period on a frame-based equipment (FBE) mode network;
- means for refraining, by the UE, from transmissions during the location of the plurality of LBT gaps; and
- means for detecting, by the UE, a common control signal from the serving base station at a beginning of the fixed frame period, wherein the common control signal identifies the fixed frame period is available for transmission according to an uplink-downlink configuration.

11. The apparatus of claim 10, further including:
- means for identifying, by the UE, data for uplink transmission;
- means for performing, by the UE, a listen before talk (LBT) procedure at a gap of the plurality of LBT gaps associated with an uplink transmission segment of the uplink-downlink configuration; and
- means for transmitting, by the UE, the data in the uplink transmission segment in response to success of the LBT procedure.

12. The apparatus of claim 10, wherein the means for receiving the location includes one of:
- means for receiving a gap pattern identifying the location of the plurality of LBT gaps in the fixed frame period; or
- means for receiving identification of a set of transmission resources in the fixed frame period, wherein the refraining from transmissions includes rate matching around the set of transmission.

\* \* \* \* \*